July 13, 1937.  J. MORKOSKI  2,086,815
PLOW COLTER
Filed June 29, 1936
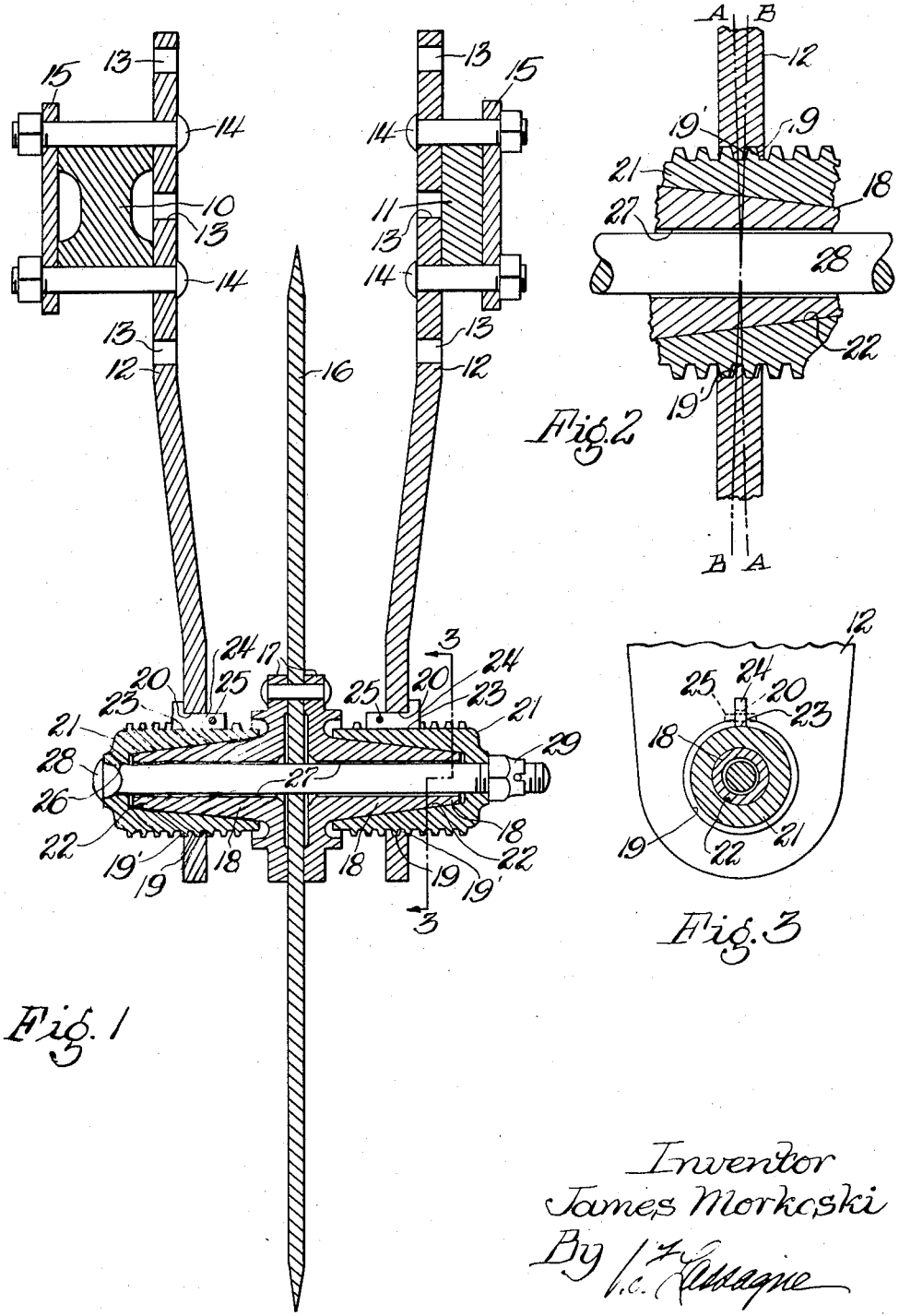
Inventor
James Morkoski
By
Atty.

Patented July 13, 1937

2,086,815

UNITED STATES PATENT OFFICE 2,086,815

PLOW COLTER

James Morkoski, Canton, Ill., assignor to International Harvester Company, a corporation of New Jersey Application June 29, 1936, Serial No. 87,875

6 Claims. (Cl. 97—209)

This invention relates to a rolling colter for plows, and more particularly to a rolling colter adjustable transversely with respect to the plow.

The main object of the invention is to provide a colter that is adjustable transversely with respect to the plow, the transverse adjustment being made between the colter supports to align the colter and the plow.

Another object is to provide a bearing structure for supporting the colter, said bearing structure being adjustable to compensate for wear in the parts thereof.

Another object is to provide means in the colter supports for carrying the bearing structure thereon in floating relation therewith.

Still another object is to provide a locking means on the colter support for maintaining the adjustment of the bearing structure and its component parts.

These and other objects will be apparent from the following description and drawing of the invention, in which:

Figure 1 is a vertical, sectional view through a colter disk and supporting structure, embodying a preferred form of the invention;

Figure 2 is an enlarged sectional view of the lower end of the colter support and a portion of the adjustable bearing member showing the floating mounting of the same with the lines A—A and B—B indicating right and left floating limitations; and Figure 3 is a side view showing a portion of the colter support and the locking means thereon, the view being taken along the line 3—3 of Figure 1 and looking in the direction indicated.

Only those portions of a plow beam and the colter supports have been shown as are necessary to describe the invention, the plow beam 10 having securely attached thereto a secondary bracket member 11. The colter supports 12 are provided with holes 13 and are attached to the beam 10 and bracket member 11 for vertical adjustment by bolts 14 and clips 15. The supports 12 are spaced apart at their lower ends to provide space for carrying a colter disk 16. The disk 16 carries on each side thereof a hub 17 provided with a conical extension 18.

At their lower ends each colter support is provided with a threaded opening 19 in axial alignment with the hubs 17 on the colter disk 16. Each support has cut out at the upper edge of each opening 19 a key slot 20.

Adjustably threaded into each opening 19 is a bearing member 21 provided at its disk side with a conical bore 22 which fits over the conical extension 18 on each hub 17. Each bearing member 21 has cut therein a key-way 23 for a purpose to appear later.

When the bearing members 21 are threaded into the threaded openings 19 in the supports 12, they cooperate with the conical extensions 18 on the hubs 17 to provide a bearing for the disk 16, the disk and hubs being rotatably journaled in the conical bores 22 in the bearing members 21. When the correct transverse adjustment of the disk with respect to the plow has been attained and the bearing members 21 and conical extensions 18 are fitted for correct bearing adjustment, the key slots 20 in the supports 12 are aligned with the key-ways 23 in the bearing members 21 and keys 24 are inserted therebetween and held by pins 25 inserted through the keys 24 at the disk sides of the supports 12.

The key slots 20, the key-ways 23 and the keys 24 form a locking means for preventing rotation of the bearing members 21.

The threaded openings 19 in the supports 12 are further machined to narrow the sides of the threaded insides of the openings as at 19' to form a linear clearance between the threaded openings and the bearing members 21, thus providing a slightly loose fit between the supports 12 and the bearing members 21 and allowing for a floating movement therebetween for self alignment of the colter disk.

The bearing members 21 are further provided with smaller bores 26, and the hubs with corresponding bores 27 in axial alignment with respect to an opening through the center of the colter disk 16. A headed bolt 28 extending through the openings and secured at its opposite end by a nut 29 provides a spacing means between the supports 12, preventing the supports from spreading axially outward with respect to the disk.

It will be readily apparent that rotation of the bearing members 21 will allow for transverse adjustment of the colter disk 16, besides providing for an adjustment in the entire bearing structure which may become necessary because of wear of the parts thereof.

It will be understood that only a preferred form of the invention has been shown and described and that many modifications of the same may be employed without detracting from the advantages obtained therefrom or without departing from the scope of the appended claims.

What is claimed is:

1. In a rolling colter construction, the combination of a colter disk, a support at each side thereof, a bearing member carried by each support for axial adjustment therein, a hub on each side of the disk cooperating with each bearing member to form a bearing for the disk, and a locking means carried by each support and engaging each of the bearing members for preventing movement of the bearing members.

2. In a rolling colter construction, the combination of a colter disk, a support at each side thereof, a bearing member carried by each support for axial adjustment therein, a hub on each side of the disk cooperating with each bearing member to form a bearing for the disk, a locking means carried by each support for preventing movement of the bearing members, and a spacing means extending through the disk, hubs, and the bearing members for preventing axial movement of the supports outwardly with respect to the disk.

3. In a rolling colter construction, the combination of a colter disk; a support at each side thereof; a bearing member adjustably threaded into and extending through each support in axial alignment with the disk, each bearing member being provided with a conical bore; a hub on each side of the disk in axial alignment, said hubs being carried in the conical bores of the bearing members to provide a bearing for the disk; and a locking member carried between each support and each bearing member for preventing rotation of the bearing member.

4. In a rolling colter construction, the combination of a colter disk; a support at each side thereof; a bearing member adjustably and loosely threaded into and extending through each support in axial alignment with the disk for slight movement relative to the supports, each bearing member being provided with a conical bore; a hub on each side of the disk in axial alignment, said hub being carried in the conical bores of the bearing members to provide a bearing for the disk; a locking member carried between each support and each bearing member for preventing rotation of the bearing member; and a bolt extending through the disk, hubs, and bearing members for preventing axial movement of the supports outwardly from the disk.

5. In a rolling colter construction, the combination of a colter disk, a support at each side thereof provided with alined threaded openings therethrough, a threaded bearing member threaded into each of said openings and extending axially through each of said supports, each of said bearing members being provided with a conical bore, a conical hub on each side of the colter disk cooperating with each bearing member to form a bearing for the disk, and a locking means removably carried by each support and engaging each of the threaded bearing members to prevent angular movement thereof.

6. In a rolling colter construction, the combination of a colter disk; a support at each side thereof, each of said supports being provided with a threaded opening therein and each of said openings being provided with a key-slot; a threaded bearing member threaded into each of said openings, each of said bearing members being provided with a conical bore and with a key-way axially in the threaded portion thereof, a conical hub on each side of the disk cooperating with each bearing member to form a bearing for the disk, and a locking means between each support and each bearing member for preventing movement of the bearing members, each of said locking means comprising a key removably positioned between each of the aforesaid key-slots and each of the aforesaid key-ways.

JAMES MORKOSKI.